(12) United States Patent
An

(10) Patent No.: US 12,476,512 B2
(45) Date of Patent: Nov. 18, 2025

(54) MOTOR

(71) Applicant: LG INNOTEK CO., LTD., Seoul (KR)

(72) Inventor: Jae Bin An, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 187 days.

(21) Appl. No.: 18/252,613

(22) PCT Filed: Nov. 12, 2021

(86) PCT No.: PCT/KR2021/016547
§ 371 (c)(1),
(2) Date: May 11, 2023

(87) PCT Pub. No.: WO2022/103202
PCT Pub. Date: May 19, 2022

(65) Prior Publication Data
US 2023/0402894 A1    Dec. 14, 2023

(30) Foreign Application Priority Data

Nov. 13, 2020    (KR) .......................... 10-2020-0151540

(51) Int. Cl.
*H02K 3/50*    (2006.01)
*H02K 11/30*    (2016.01)

(52) U.S. Cl.
CPC .............. *H02K 3/50* (2013.01); *H02K 11/30* (2016.01); *H02K 2203/06* (2013.01)

(58) Field of Classification Search
CPC ........ H02K 11/30; H02K 11/33; H02K 3/522; H02K 3/50; H02K 15/32; H02K 2203/06; H02K 2211/03

USPC .......................................................... 310/71
See application file for complete search history.

(56) References Cited

U.S. PATENT DOCUMENTS

2015/0015101 A1*    1/2015    Murakami ............. H02K 5/225
310/71

FOREIGN PATENT DOCUMENTS

| JP | 2929770 B2 | 5/1999 |
| KR | 20-0202066 Y1 | 1/2001 |
| KR | 10-2005-0123234 A | 12/2005 |
| KR | 20050123234 A * | 12/2005 |
| KR | 10-2011-0028852 A | 3/2011 |
| KR | 10-2011-0063966 A | 6/2011 |
| KR | 10-2020-0029873 A | 3/2020 |

OTHER PUBLICATIONS

Park Taein, Title not Available, Dec. 29, 2005, KR 20050123234 (English Machine Translation) (Year: 2005).*

(Continued)

*Primary Examiner* — Alexander A Singh
(74) *Attorney, Agent, or Firm* — SALIWANCHIK, LLOYD & EISENSCHENK

(57) ABSTRACT

The present invention can provide a motor including a shaft, a rotor coupled to the shaft, a stator disposed to correspond to the rotor, and a control unit electrically connected to the stator, wherein the control unit includes a substrate and an element having a lead disposed on the substrate, the lead of the element is coupled to the substrate using a solder and includes an end exposed from the solder, and the solder is spaced apart from the end of the lead.

6 Claims, 8 Drawing Sheets

(56) References Cited

OTHER PUBLICATIONS

International Search Report dated Feb. 25, 2022 in International Application No. PCT/KR2021/016547.
Office Action dated Aug. 13, 2025 in Korean Application No. 10-2020-0151540.

* cited by examiner

MOTOR

CROSS-REFERENCE TO RELATED APPLICATIONS

This application is the U.S. national stage application of International Patent Application No. PCT/KR2021/016547, filed Nov. 12, 2021, which claims the benefit under 35 U.S.C. § 119 of Korean Application No. 10-2020-0151540, filed Nov. 13, 2020, the disclosures of each of which are incorporated herein by reference in their entirety.

TECHNICAL FIELD

The present invention relates to a motor.

BACKGROUND ART

Generally, in a motor, a rotor rotates due to an electromagnetic interaction between a rotor and a stator. In this case, a shaft connected to the rotor also rotates to generate a rotational driving force. The motor may include a control unit which controls an operation of the motor. The control unit may include a substrate on which elements are disposed. Leads of the elements may be bonded to the substrate using solder.

The leads may be disposed to pass through the substrate. In this case, an end of each of the leads is bonded to the substrate using the solder in a state in which the end protrudes from the substrate. Meanwhile, an image of a cross-section of the end of the lead can be used to check whether all the leads are soldered without missing leads. However, when a protruding length of the lead is smaller than that of the substrate, there is a problem that the end of the lead is buried by the solder and becomes invisible from the outside.

DISCLOSURE

Technical Problem

Accordingly, the present invention is intended to address the above problems and directed to providing a motor which allows an image of an end cross section of a lead wire to be secured for inspection even when a protruding length of a lead is smaller than that of a substrate.

Objectives to be achieved through the present invention are not limited to the above-described objectives, and other objectives which are not described above will be clearly understood by those skilled in the art through the following descriptions.

Technical Solution

One aspect of the present invention provides a motor including a shaft, a rotor coupled to the shaft, a stator disposed to correspond to the rotor, and a control unit electrically connected to the stator, wherein the control unit includes a substrate and an element having a lead disposed on the substrate, the lead of the element is coupled to the substrate using a solder and includes an end exposed from the solder, and the solder is spaced apart from the end of the lead.

Another aspect of the present invention provides a motor including a motor unit and a control unit coupled to the motor unit, wherein the control unit includes a substrate, an element having a lead disposed on the substrate, and a solder coupling the lead to the substrate, the lead includes an end and a side surface extending from a surface of the end of the lead, and a portion of the side surface of the lead and the end of the lead are exposed from the solder.

Still another aspect of the present invention provides a motor including a motor unit and a control unit coupled to the motor unit, wherein the control unit includes a substrate, an element having a lead disposed on the substrate, and a solder coupling the lead to the substrate, the lead includes an end exposed from the solder, and an uppermost end of the solder is disposed at a level that is lower than or equal to a level of the end of the lead.

Advantageous Effects

According to an embodiment, there is an advantage in securing an image of an end cross section of a lead even when a protruding length of a lead is shorter than a substrate.

According to an embodiment, there is an advantage in reducing a length of a lead.

According to an embodiment, there is an advantage in improving accuracy of defect inspection for a substrate by arranging an end of a lead to be spaced apart from a solder to secure a clear image of an end cross section of the lead which is distinct from the solder.

MODES OF THE INVENTION

A direction parallel to a longitudinal direction (vertical direction) of a shaft is referred to as an axial direction, a direction perpendicular to the axial direction based on the shaft is referred to as a radial direction, and a direction along a circle having a radius in the radial direction from the shaft is referred to as a circumferential direction.

Figure 1:
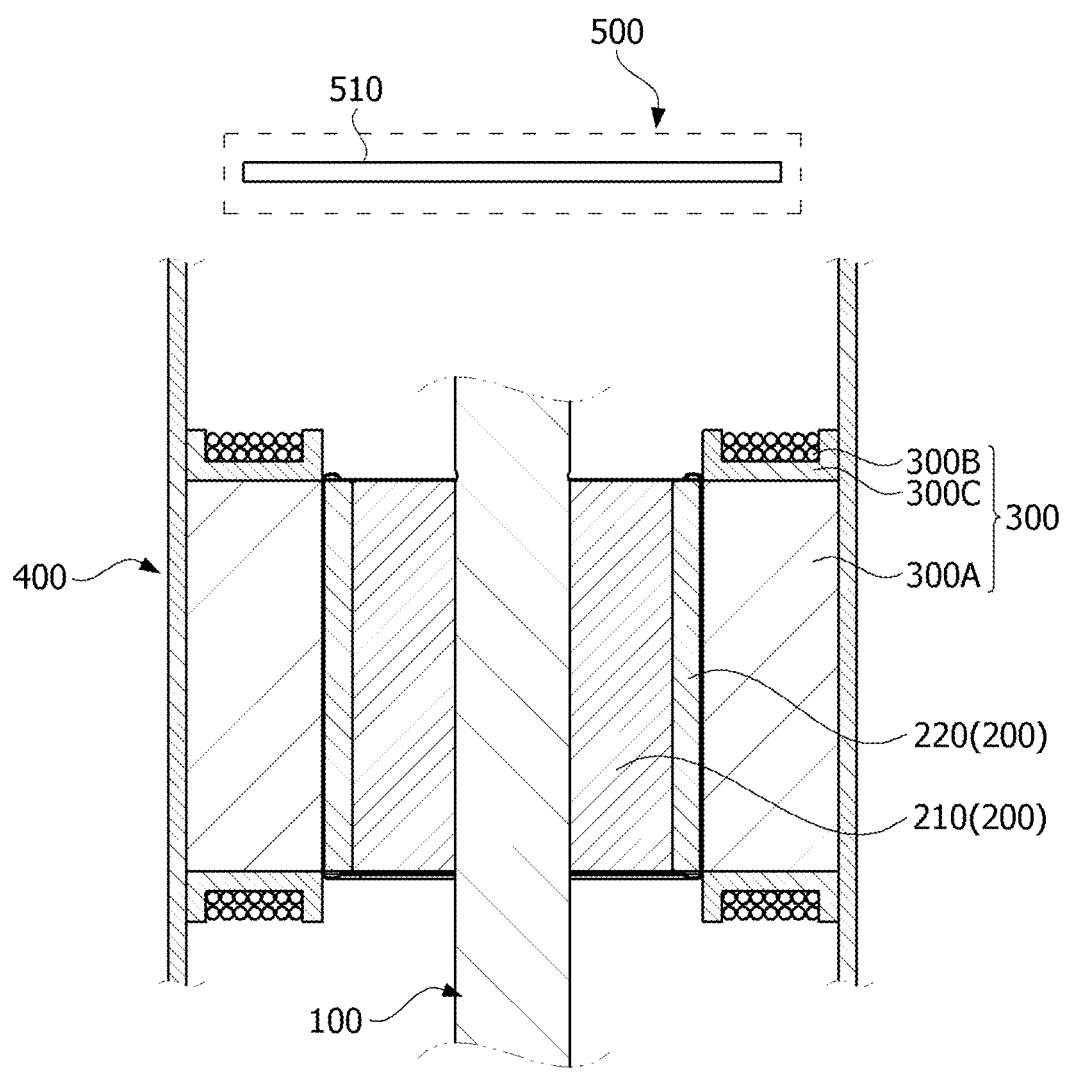
FIG. 1 is a side cross-sectional view illustrating a motor according to an embodiment.

FIG. 1 is a side cross-sectional view illustrating a motor according to an embodiment.

Referring to FIG. 1, the motor according to the embodiment may include a shaft 100, a rotor 200, a stator 300, a housing 400, and a control unit 500.

Hereinafter, the term "inward" refers to a direction from the housing 400 toward the shaft 100 which is a center of the motor, and the term "outward" refers to a direction opposite to "inward," that is, a direction from the shaft 100 toward the housing 400.

The shaft 100 may be coupled to the rotor 200. When a current is supplied and an electromagnetic interaction between the rotor 200 and the stator 300 occurs, the rotor 200 rotates and the shaft 100 rotates in conjunction with the rotor 200. The shaft 100 may be formed of a hollow member.

The rotor 200 rotates due to an electrical interaction with the stator 300. The rotor 200 may be disposed to correspond to the stator 300 and may be disposed inside the stator 300. The rotor 200 may include a rotor core 210 and a plurality of magnets 220 coupled to the rotor core 210.

The stator 300 is disposed outside the rotor 200. The stator 300 may include a stator core 310, an insulator 320, and a coil 330. The insulator 320 is seated on the stator core 310. The coil 330 is mounted on the insulator 320. The coil 330 induces an electrical interaction with the magnets 220 of the rotor 200.

The housing 400 may be disposed outside the stator 300. The housing 400 may be a cylindrical member having one open side.

The control unit 500 may be electrically connected to the stator 300 and may transmit control signals related to operations of a power supply and the motor to the stator 300. The control unit 500 may include a substrate 510 on which elements are disposed. The control unit 500 is disposed inside the housing 400 or may be accommodated in a separate housing or bracket and mounted on the housing 400.

Figure 2:
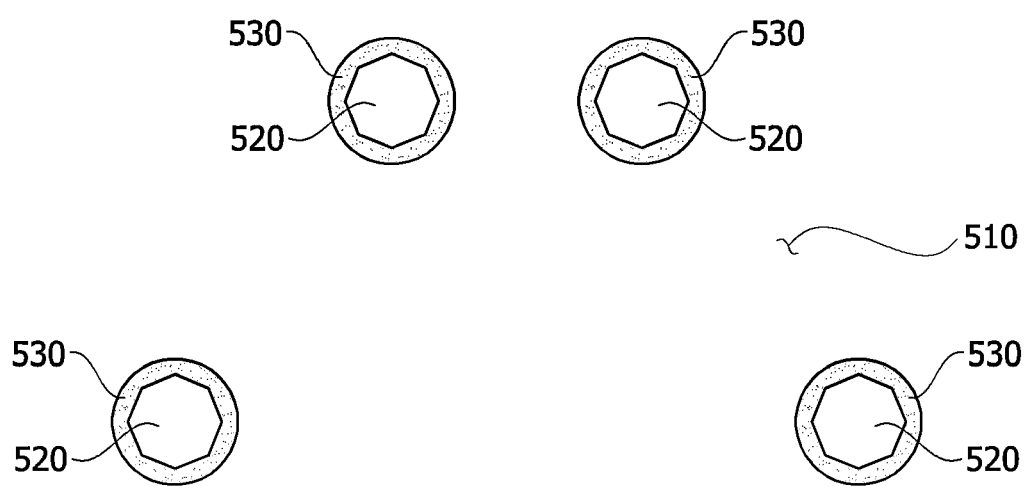
FIG. 2 is a plan view illustrating leads disposed on a substrate of a control unit illustrated in FIG. 1.
Figure 3:
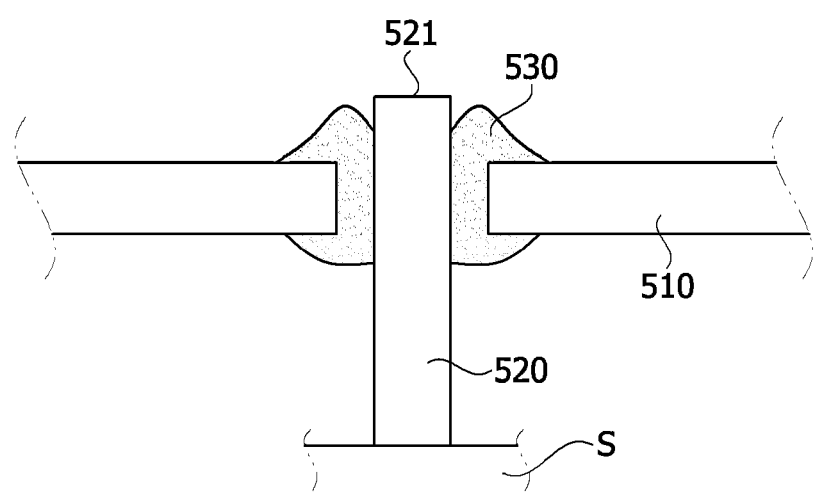
FIG. 3 is a side cross-sectional view illustrating the lead illustrated in FIG. 2.

FIG. 2 is a plan view illustrating leads disposed on the substrate of the control unit illustrated in FIG. 1, and FIG. 3 is a side cross-sectional view illustrating the lead illustrated in FIG. 2.

Referring to FIGS. 2 and 3, an element S may be connected to the substrate 510 through a lead 520. The lead 520 is fixed to the substrate 510 using a solder 530. Whether the element S is properly connected to the substrate 510 by soldering may be checked using an image of the lead 520. As illustrated in FIG. 2, an exposed portion of the lead 520 may be checked after soldering to determine whether the number of leads 520 is correct and whether a soldering state is good. Even after the soldering, an end 521 of the lead 520 may be exposed without being covered by the solder 530 to determine whether the substrate 510 is good through vision inspection.

Figure 4:
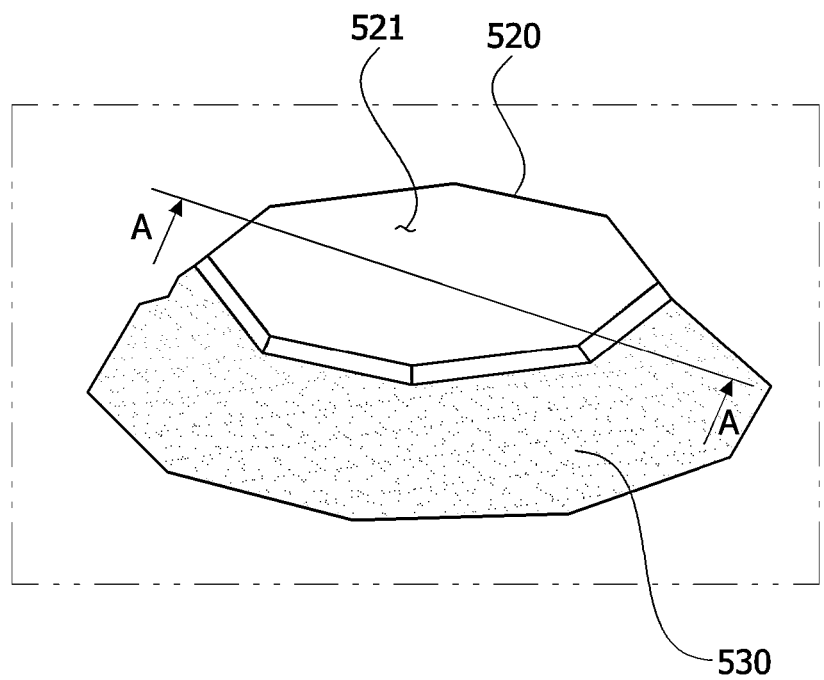
FIG. 4 is a perspective view illustrating the lead and a solder disposed on the substrate.
Figure 5:
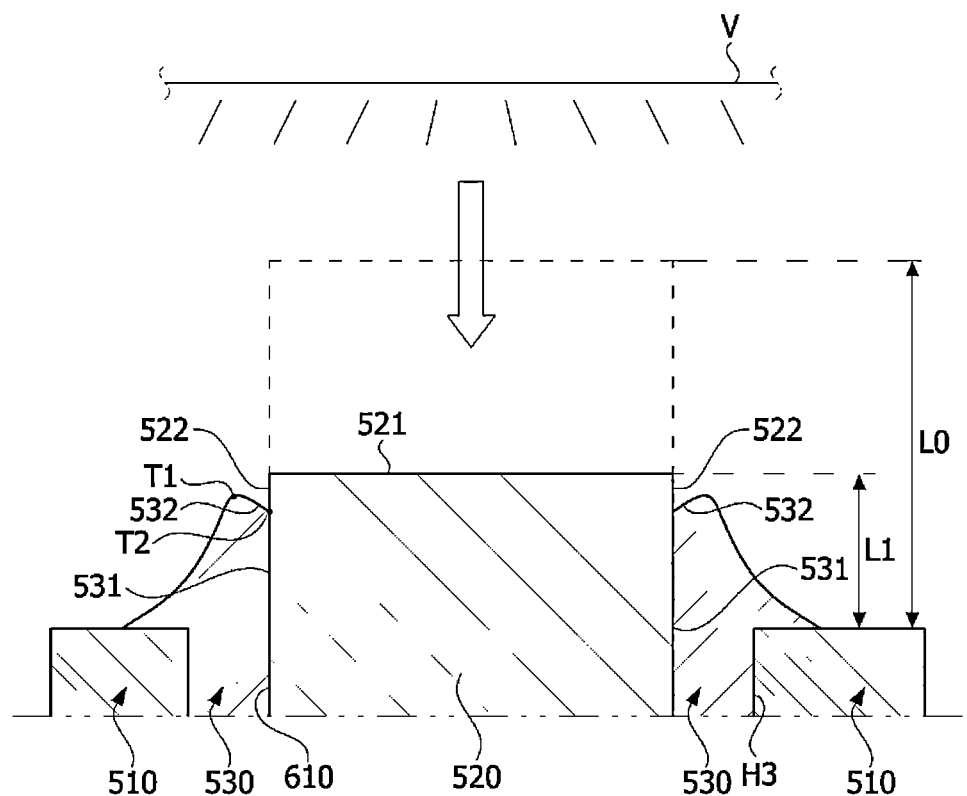
FIGS. 5 and 6 are side cross-sectional views illustrating the lead and the solder along line A-A of FIG. 4.
Figure 6:
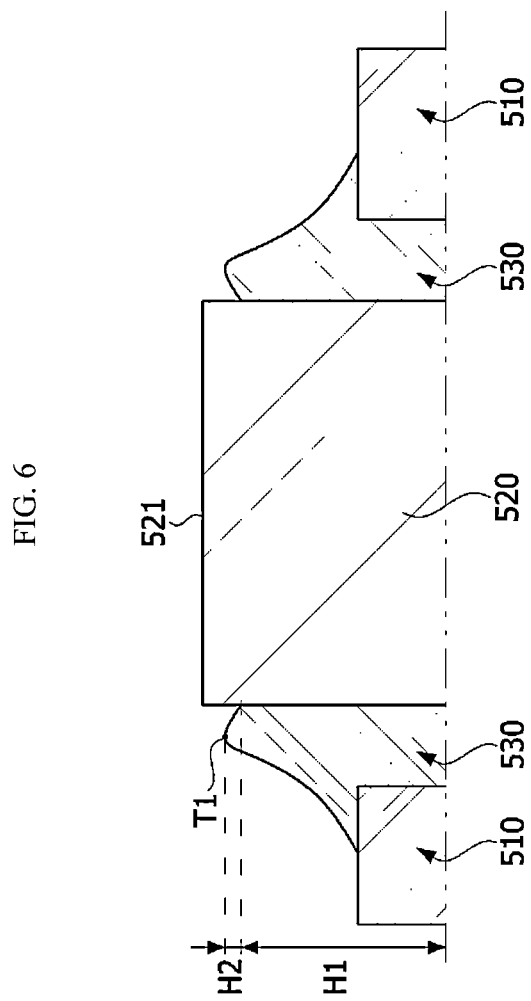

FIG. 4 is a perspective view illustrating the lead 520 and the solder 530 disposed on the substrate, and FIGS. 5 and 6 are side cross-sectional views illustrating the lead 520 and the solder 530 along line A-A of FIG. 4.

Referring to FIGS. 4 and 5, the end 521 of the lead 520 is exposed from the solder 530. The solder 530 is spaced apart from the end 521 of the lead 520. Accordingly, a portion 522 of a side surface extending from the end 521 of the lead 520 may be exposed from the solder 530. In addition, since the end 521 of the lead 520 is spaced apart from the solder 530, a clearer image of the end 521 of the lead 520 may be secured in the vision inspection.

The solder 530 may include an inner surface 531 and an inclined surface 532. The inner surface 531 is in contact with the side surface of the lead 520. The inclined surface 532 extends from the inner surface 531 and is obliquely disposed. The inclined surface 532 is spaced apart from the side surface of the lead 520 and spaced apart from the end 521 of the lead 520.

Meanwhile, the solder 530 may include a hole coupled to the lead 520. The hall may be divided into a first hole H1 and a second hole H2 connected to the first hole H1. The first hole H1 is in contact with the lead 520, and the second hole H2 is spaced apart from the end 521 of the lead 520. The second hole H2 may include the inclined surface 532. An uppermost end T1 of the solder 530 may be disposed at a lower level than the end 521 of the lead 520 and disposed at a higher level than the substrate 510. The level of the uppermost end T1 of the solder 530 may be higher than that of an uppermost end T2 of the inner surface 531. Accordingly, the uppermost end T1 of the solder 530 may be disposed on the inclined surface 532 extending from the inner surface 531. A shape of the solder 530 is formed by soldering performed while the end 521 of the lead 520 is masked.

In order to expose the end 521 of the lead 520 from the solder 530, a length L1 of the lead 520 protruding from the substrate 510 may be significantly reduced from the conventional length L0. Accordingly, there is an advantage in greatly reducing an amount of a material by reducing the length of the lead 520. In addition, since the soldering process is performed while the end 521 of the lead 520 is masked, there is an advantage in fundamentally solving a problem that an inspection apparatus cannot detect the lead 520 because the lead 520 is short and thus the end 521 of the lead 520 is covered by the solder 530.

Meanwhile, the substrate 510 may include a third hole H3 passing through one surface and the other surface of the substrate 510. The lead 520 may be positioned inside the third hole H3, and a portion of the solder 530 may be positioned between the third hole H3 and the lead 520. A portion of the inner surface 531 of the solder 530 is positioned inside the third hole H3.

When the end 521 of the lead 520 is viewed, the uppermost end T1 of the solder 530 may be positioned inside the third hole H3. This is caused by positions of a masking jig 20 (see FIG. 7) and a solder bath 10.

Figure 7:
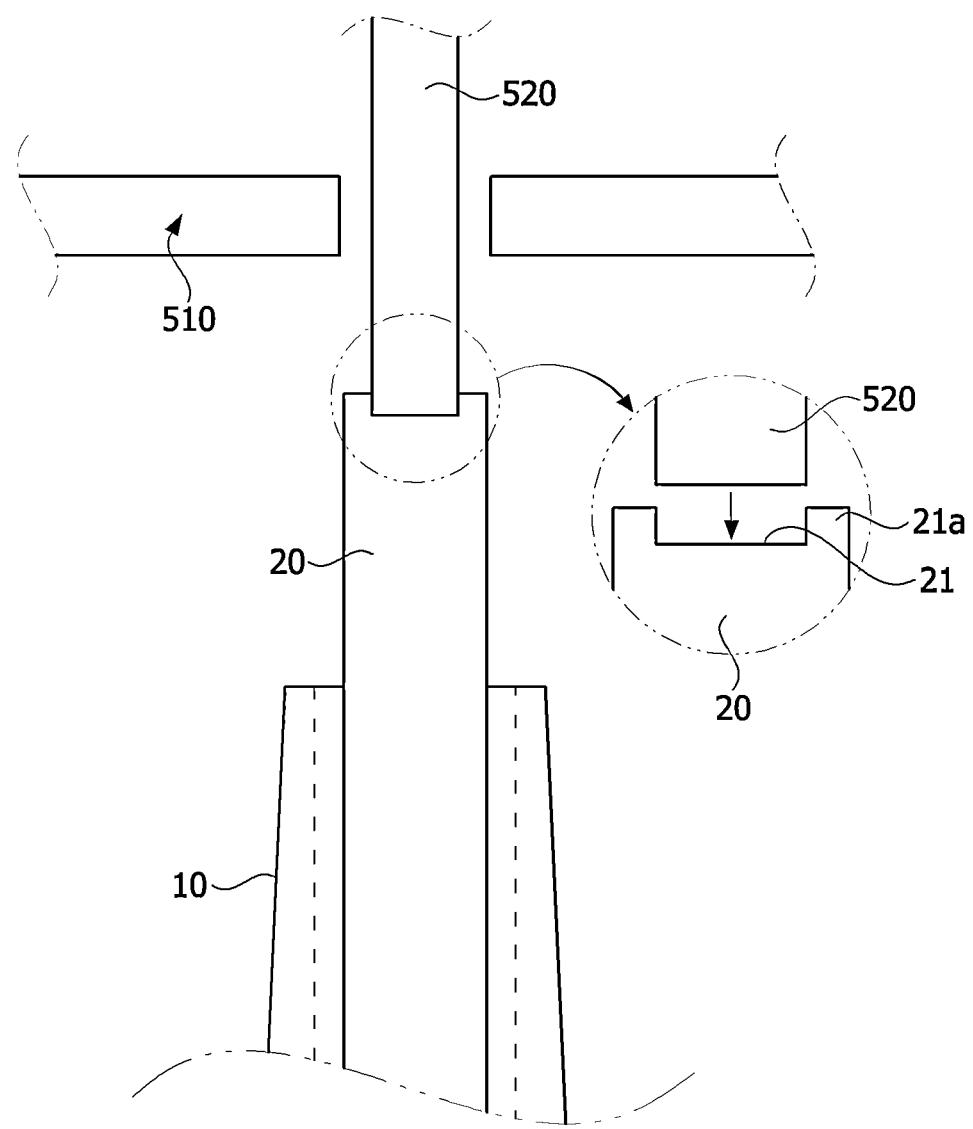
FIG. 7 is a view illustrating a masking jig and a solder bath for performing a soldering process.

FIG. 7 is a view illustrating the masking jig 20 and the solder bath 10 for performing the soldering process.

Referring to FIG. 7, the solder bath 10 is disposed below the substrate 510 and the lead 520. In addition, the masking jig 20 is disposed inside the solder bath 10. The masking jig 20 may be slidably disposed inside the solder bath 10. The masking jig 20 may be maintained at a predetermined level due to a pneumatic pressure in the solder bath 10. An end 521 of the masking jig 20 is in contact with the end 21 of the lead 520. And the masking jig 20 may include an annular protrusion 21a along a circumference of the end 21. The protrusion 21a is in contact with the side surface of the lead 520 extending from a surface of the end 521 of the lead 520. A region of the lead 520 in contact with the masking jig 20 is a region which is not in contact with the solder 530 and exposed from the solder 530.

Figure 8:
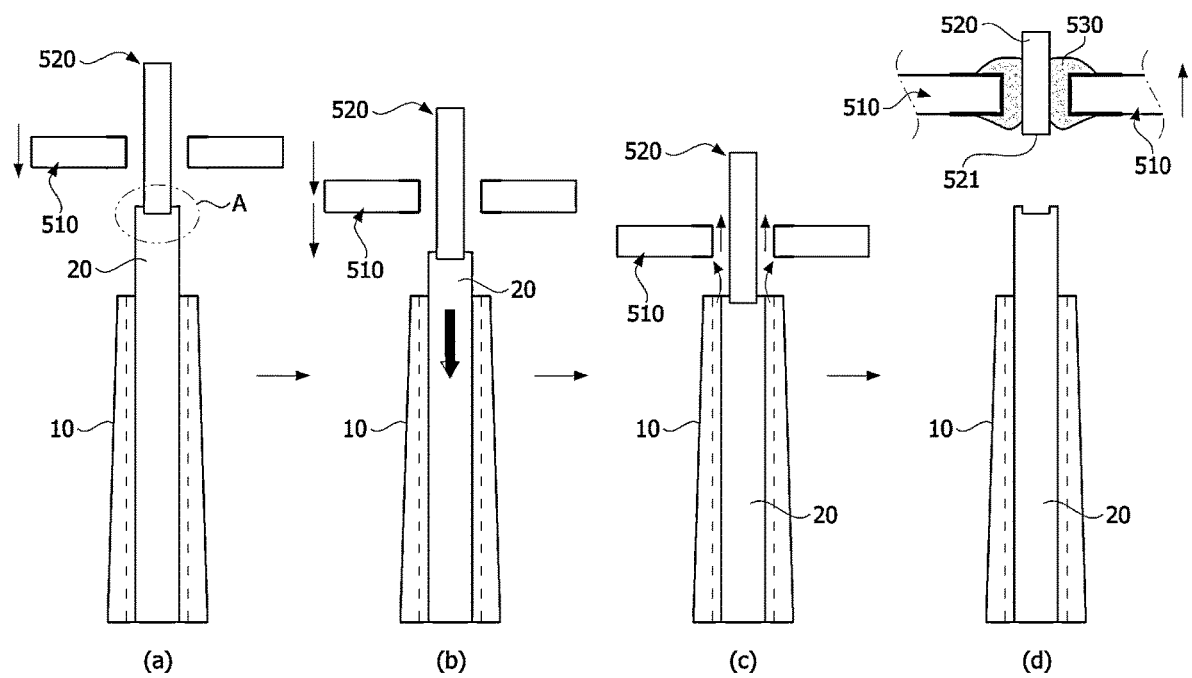
FIG. 8 is a set of views illustrating the soldering process.

FIG. 8 is a set of views illustrating the soldering process.

Referring to FIGS. 7 and 8A, the substrate 510 and the lead 520 move downward so that the surface of the end 521 of the lead 520 comes into contact with a surface of the end 521 of the masking jig 20. As illustrated in FIG. 8A, when the lead 520 comes into contact with the masking jig 20, the pneumatic pressure of the masking jig 20 is removed, and as illustrated in FIG. 8B, the masking jig 20 moves downward with the substrate 510 and the lead 520 until the substrate 510 and the lead 520 are close to the solder bath 10.

As illustrated in FIG. 8C, when the substrate 510 and the lead 520 are close to the solder bath 10, the solder 530 is discharged from the solder bath 10 to perform the soldering process. In this case, the end 521 and a portion 522 (see FIG. 5) of the side surface of the lead 520 are not covered by the solder 530 because the end 521 and the portion 522 are in contact with the masking jig 20.

As illustrated in FIG. 8D, when the substrate 510 and the lead 520 move upward after the soldering process is completed, the end 521 and the portion 522 (see FIG. 5) of the side surface of the lead 520 are exposed from the solder 530 in a state in which the lead 520 is fixed to the substrate 510.

In the above embodiments, an example of an inner rotor type motor has been described, but the present invention is not limited thereto. The present invention can also be applied to an outer rotor type motor. In addition, the present invention can be used in various devices such as vehicles or home appliances.

The invention claimed is:

1. A motor comprising:
a shaft;
a rotor coupled to the shaft;
a stator disposed to correspond to the rotor; and
a control unit electrically connected to the stator,
wherein the control unit includes a substrate and an element having a lead disposed on the substrate,
wherein the lead of the element is coupled to the substrate using a solder and includes an end exposed from the solder,
wherein the solder is spaced apart from the end of the lead,
wherein the solder includes:
an inner surface in contact with a side surface of the lead; and
an inclined surface obliquely extending from the inner surface and spaced apart from the end,
wherein the substrate comprises a third hole, in which the lead is disposed,
wherein, when the end of the lead is viewed, an uppermost end of the solder is positioned inside the third hole,
wherein the solder includes a first hole and a second hole connected to the first hole,
wherein the first hole is in contact with the lead, and
wherein the second hole is spaced apart from the end of the lead.

2. The motor of claim 1, wherein the inclined surface is spaced apart from the end of the lead.

3. The motor of claim 1, wherein the solder includes:
a hole coupled to the lead; and
an uppermost end spaced apart from the end of the lead.

4. The motor of claim 1, wherein a portion of a side surface extending from the end of the lead is exposed from the solder.

5. The motor of claim 1, wherein an uppermost end of the solder is disposed at a lower level than the end of the lead and disposed at a higher level than the substrate.

6. A motor comprising:
a shaft;
a rotor coupled to the shaft;
a stator disposed to correspond to the rotor; and
a control unit electrically connected to the stator,
wherein the control unit includes a substrate and an element having a lead disposed on the substrate,
wherein the lead of the element is coupled to the substrate using a solder and includes an end exposed from the solder,
wherein the solder is spaced apart from the end of the lead,
wherein the solder includes:
an inner surface in contact with a side surface of the lead; and
an inclined surface obliquely extending from the inner surface and spaced apart from the end,
wherein the substrate comprises a third hole in which the lead is disposed,
wherein, when the end of the lead is viewed, an uppermost end of the solder is positioned inside the third hole,
wherein the inclined surface is spaced apart from the end of the lead, and
wherein an uppermost end of the inclined surface is disposed at a higher level than an uppermost end of the inner surface.

* * * * *